Dec. 25, 1923.
R. J. CAVILLA
EGG BOILER
Filed Oct. 30, 1922
1,478,939
2 Sheets-Sheet 1
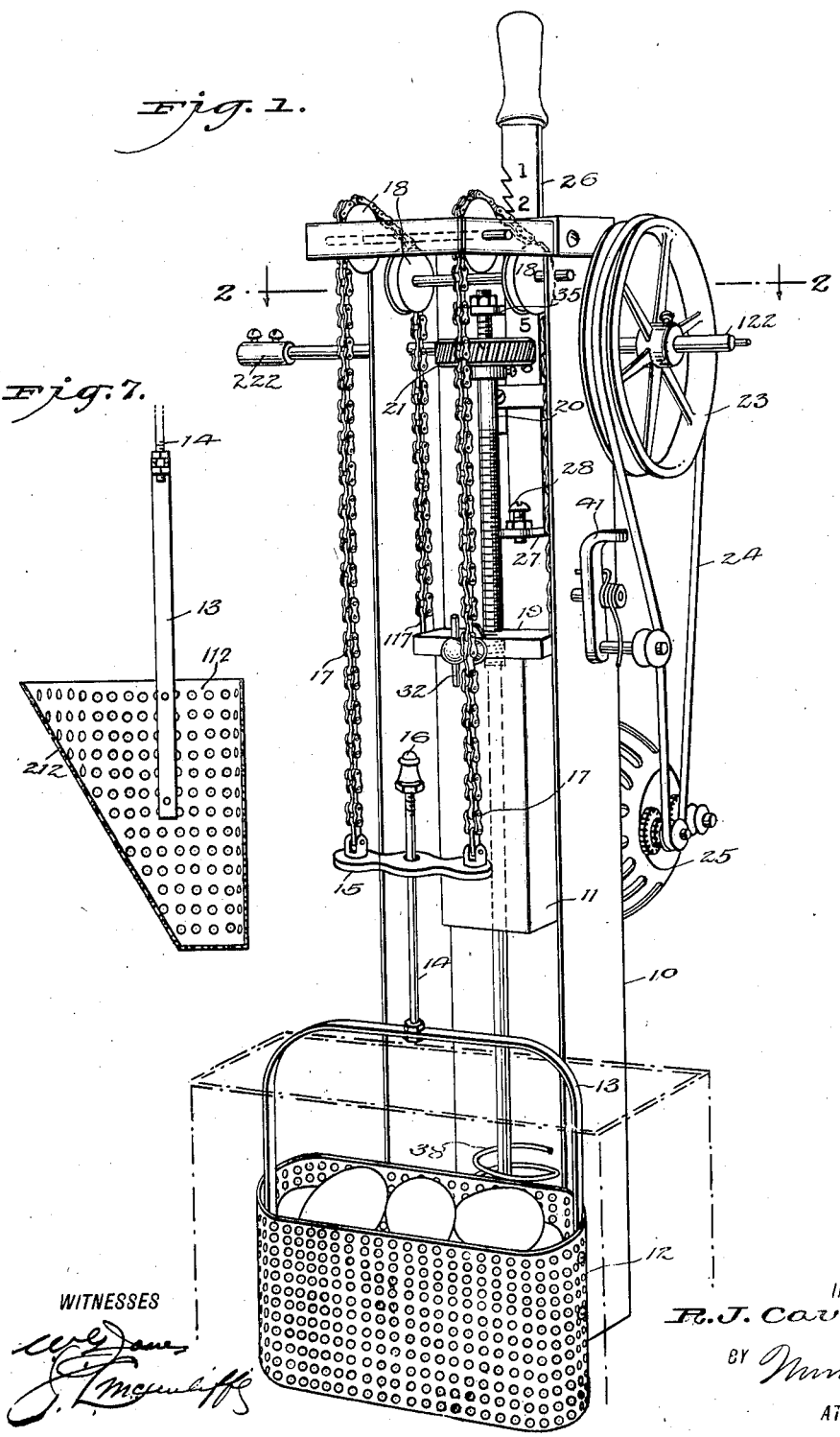

Dec. 25, 1923.
R. J. CAVILLA
EGG BOILER
Filed Oct. 30, 1922
1,478,939
2 Sheets-Sheet 2
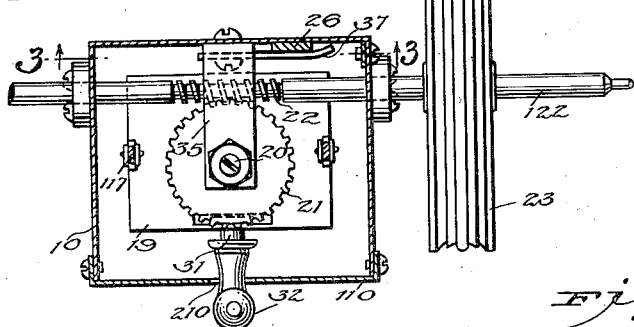
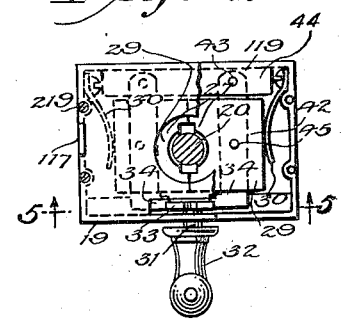
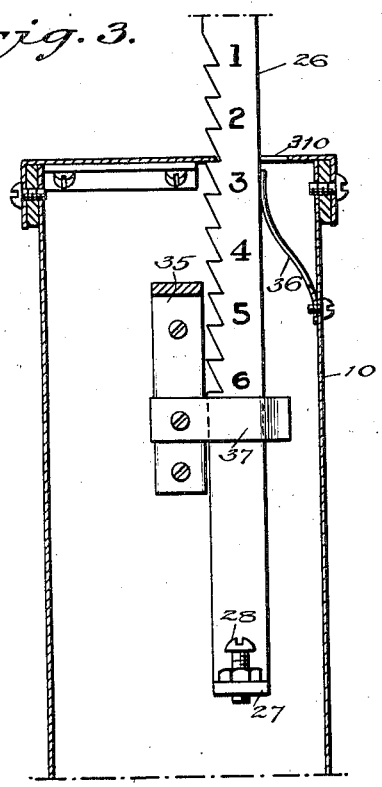
WITNESSES
INVENTOR
R. J. Cavilla
BY
ATTORNEYS Patented Dec. 25, 1923.

1,478,939

UNITED STATES PATENT OFFICE.

ROGELIO J. CAVILLA, OF NEW YORK, N. Y.

EGG BOILER.

Application filed October 30, 1922. Serial No. 597,901.

*To all whom it may concern:*

Be it known that I, ROGELIO J. CAVILLA, a subject of the King of Great Britain, and a resident of the city of New York, borough of the Bronx, in the county of Bronx and State of New York, have invented a new and Improved Egg Boiler, of which the following is a description.

My invention relates to egg boilers and more particularly to the type of egg boiler in which a basket containing the eggs is lifted from the boiling water at the expiration of the period of time for which the device has been set.

The general object of my invention is to provide an egg boiler of the indicated character improved in various particulars with a view to insure precision of operation in the lifting of the basket and without shock, and a novel means regulating the period to which the device is to be set.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1 is a perspective view of an egg boiler embodying my invention, the front of the standard being removed to show the interior parts;

Figure 2 is a horizontal section as indicated by the line 2—2, Figure 1;

Figure 3 is a vertical section of the upper portion of the device in a plane indicated by the line 3—3, Figure 2;

Figure 4 is a plan view of the split nut, the screw spindle being in horizontal section;

Figure 5 is a vertical section on the line 5—5, Figure 4;

Figure 6 is a vertical section of the lower portion of the standard;

Figure 7 is a vertical section through the basket in the preferred form.

In carrying out my invention in accordance with the illustrated example a box-like standard 10 is provided in which is vertically movable a weight 11, said weight serving as hereinafter explained to lift a basket 12 containing the eggs. Said basket has a bail 13 from which rises a standard 14 and provided with a nut 16 at its upper end, said standard extending through a horizontal cross head 15 suspended by chains 17 running over sheaves 18 at the top of the standard 10 and downwardly within the standard 10. The inner ends of said chains are secured to the casing of a split nut 19 on the weight 11, the chains being secured to any suitable members 117 on said casing.

A split nut 19 is adapted to be variously engaged with a threaded portion of a vertical spindle 20, the lower portion of which is unthreaded. The spindle 20 is driven in any suitable manner, there being shown in the present instance a worm wheel 21 thereon driven by a worm 22 on a shaft 122. In practice a series of my improved egg boilers are adapted to be connected up side by side to be driven by a single drive means to adapt the device for use in hotels and restaurants for which my device is particularly intended. The shaft 122 of each individual egg boiler is connected up with an adjacent one by any suitable means, as for instance by a coupling sleeve 222.

For driving the shaft 122 I have shown a pulley 23 driven by a belt 24 from a small electric motor 25 which in this instance is shown supported on the standard 10.

Means to set the device for boiling eggs for a given period, say one, two, three or more minutes, is provided in the form of a vertical bar 26, bearing the numerals 1 to 6, for example, representing different periods of time measured by minutes. The bar 26 is vertically adjustable in top of standard 10 and at its lower end within the standard is formed with a laterally directed foot 27 which advantageously has a screw 28 for exactness of adjustment.

The split nut 19 is specially adapted for its present purpose and consists of two sections 29 having threads, the ends of which are serrated to grip the threads on spindle 20. For separating the sections 29 to release the spindle, a lateral shaft 31 is provided having a handle 32 for turning the same and provided with a cam 33 disposed between projections 34 on levers 42 fulcrumed as at 43 at one end to a fixed portion 44 rigid with the weight 11 and pivoted as at 45 to the respective nut sections 29. Thus, the turning of the shaft 31 will separate the sections 29 for releasing the spindle. Cam 33 has notches 46 at the top and bottom and notches 47 at the opposite sides in which the projections 39 engage in both positions of the material. The front 110 of the standard 10 has a vertical slot 210 for the passage of the handle 32.

With the above described construction the split nut 19 is released and said nut and the weight 11 to which it is attached are raised until the upward movement is arrested by the nut engaging the foot 27. The handle 32 controlling the split nut is then released permitting the springs 30 to engage the nut with the threads on the spindle, 20. The spindle having been driven by the turning of the shaft 122, the engagement with the split nut 19 will gradually cause the weight 11 to descend until the nut 19 reaches the unthreaded lower portion of the spindle 20, whereupon the weight is permitted to suddenly drop. In the meantime the gradual descent of the weight 11 acts through the chains 17 and gradually raises the cross head 15 to a plane adjacent the head 16 of standard 14 so that upon the sudden dropping of the weight 11, cross head 15 will engage the head 16 and lift the spindle 14 and the basket 12 out of the boiling water.

I have shown the bar 26 passing through a hole 310 in the top of the standard 10 and movable against a guide bracket 35 against which said bar is pressed by a spring 36; a guard 37 secured to the guide bracket 35 overlies bar 26, the whole serving to prevent displacement of the bar 26. With the bar 26 raised more or less to dispose a given number thereon at the slot directly above the top of standard 10, the nut 19 will be caused to travel a greater or less distance downwardly on the threads of the spindle 20 before reaching the unthreaded portion for permitting the weight to drop.

The weight 11 in dropping is cushioned by a buffer spring 38 surrounding the lower end of spindle 20. The lower end of said spindle 20 is on a center bearing 39 adjustable by a nut 40 on the bottom of the standard 10.

The numeral 41 indicates a tightener for belt 24 but said belt tightener is not claimed in the present application and its details do not need description.

The egg basket in the preferred form is shown in Figure 7 and designated 112 in which figure it will be seen that the front of the basket flares as indicated at 212.

I would state in conclusion that while the illustrated example constitutes a practical edbodiment of my invention, I do not limit myself strictly to the exact details herein illustrated, since, manifestly, the same can be considerably varied without departure from the spirit of the invention as defined in the appended claims.

Having thus described my invention, I claim:

1. An egg boiler including an egg basket, means to lift said basket, a weight connected with said lift means to actuate the same, a vertical spindle having threads, means on the weight adapted to engage said threads or to release the same, and means to turn said spindle, whereby to cause the second-mentioned means to travel and the weight to thus descend for causing the basket to be lifted when the means engaging the threads reach the lower end of the latter and pass out of engagement with the threads.

2. An egg boiler including a vertical spindle, having threads, means to turn the spindle, a weight adapted to travel along the spindle, means on the weight to engage the threads, lift means subject to the descent of the weight, a basket, and means on the basket adapted to be engaged by the lift means, said lift means having a limited travel independently of the means on the basket.

3. An egg boiler including a vertical spindle having threads and an unthreaded portion below the threads, a weight adapted to travel along said spindle, a split nut on said weight, means to optionally engage said split nut with the threads of the spindle or to disengage the same, a gage bar vertically adjustable and constituting a stop limiting the upward movement of said weight and split nut, lift means actuated by the descent of said weight, and a basket having means adapted to be engaged by the lift means for lifting the basket.

4. An egg boiler including an egg basket, means to lift said basket, a weight connected with said lift means to actuate the same, a vertical spindle having threads, means on the weight adapted to engage said threads, or to release the same, and means to turn said spindle whereby to cause the second-mentioned means to travel and the weight to thus descend for causing the basket to be lifted when the means engaging the threads reach the lower end of the latter and pass out of engagement with the threads; together with variable means to limit the upward movement of the weight and thereby determine the extent of its downward travel before release.

5. An egg boiler including a vertical spindle having a threaded portion and an unthreaded portion below said threaded portion, a weight adapted to travel along said spindle, means to turn the spindle, flexible means connected with said weight to be actuated by the latter, a cross head suspended by said flexible means, a basket, a standard on the basket extending through said cross head and having a head above the cross head, and a split nut on the weight, said split nut comprising nut sections, springs tending to press said sections toward the spindle, a turntable shaft, and a cam on said shaft adapted to engage and separate the nut sections against the pressure of said springs.

6. An egg boiler including a vertical spindle having a threaded portion and an unthreaded portion below said threaded portion, a weight adapted to travel along said spindle, means to turn the spindle, flexible means connected with said weight to be actuated by the latter, a cross head suspended by said second means, a basket, a standard on the basket extending through said cross head and having a head above the cross head, and a split nut on the weight, said split nut comprising nut sections, springs tending to press said sections toward the spindle, a turnable shaft, and a cam on said shaft adapted to engage and separate the nut sections against the pressure of said springs; together with a bar vertically adjustable above the nut and weight to limit the upward movement of the latter, said bar having indicia thereon to indicate the extent of adjustment.

7. An egg boiler comprising a standard, a vertical spindle, a weight adapted to travel along the spindle, a basket, lift means for the basket and connected with said weight, and means on the weight adapted to variously engage the threads of the spindle.

8. An egg boiler comprising a standard, a transverse shaft thereon, a vertical spindle having threads, a weight adapted to travel along the spindle, a basket, lift means for the basket and connected with said weight, and means on the weight adapted to variously engage the threads of the spindle; together with means to couple said shaft to the shafts of adjacent egg boilers for simultaneously operating a number of the egg boilers.

ROGELIO J. CAVILLA.